(12) United States Patent
Lu

(10) Patent No.: US 9,414,637 B2
(45) Date of Patent: Aug. 16, 2016

(54) SMART SHOES WITH WIRELESS TRANSMITTER

(71) Applicant: Honeywell International Inc., Morristown, NJ (US)

(72) Inventor: Kui Lu, Shanghai (CN)

(73) Assignee: Honeywell International Inc., Morris Plains, NJ (US)

(*) Notice: Subject to any disclaimer, the term of this patent is extended or adjusted under 35 U.S.C. 154(b) by 98 days.

(21) Appl. No.: 14/478,719

(22) Filed: Sep. 5, 2014

(65) Prior Publication Data

US 2016/0066644 A1  Mar. 10, 2016

(51) Int. Cl.
| | |
|---|---|
| H04W 24/00 | (2009.01) |
| A43B 3/00 | (2006.01) |
| H04W 4/02 | (2009.01) |
| G01S 5/02 | (2010.01) |

(52) U.S. Cl.
CPC .............. *A43B 3/0005* (2013.01); *G01S 5/02* (2013.01); *H04W 4/02* (2013.01)

(58) Field of Classification Search
USPC ............................................. 455/456.1, 11.1
See application file for complete search history.

(56) References Cited

U.S. PATENT DOCUMENTS

| 7,474,206 B2 | 1/2009 | Bertagna et al. |
| 8,718,935 B2 | 5/2014 | Miller et al. |
| 2003/0092378 A1* | 5/2003 | Satoh ................. A63B 24/0006 455/11.1 |
| 2011/0054359 A1* | 3/2011 | Sazonov ............. A43B 3/0005 600/595 |
| 2012/0172677 A1* | 7/2012 | Logan .................... A61B 5/082 600/301 |

FOREIGN PATENT DOCUMENTS

| CN | 103230120 A | 8/2013 |
| KR | 20110067771 A  * | 6/2011 |

OTHER PUBLICATIONS

English translation of abstract of CN103230120 (A).
Yoann Charlon et al., A Telemetry System Embedded in Clothes for Indoor Localization and Elderly Health Monitoring; Sensors 2013, 13, 11728-11749; doi:10.3390/s130911728; www.mdpi.com/journal/sensors.

* cited by examiner

*Primary Examiner* — David Q Nguyen
(74) *Attorney, Agent, or Firm* — Conley Rose, P.C.; Kristin Jordan Harkins

(57) ABSTRACT

A locating and tracking system includes shoes, which carry a wireless module. A user walking the area causes clicking or intermittent energizing a transmitter carried in the module. The transmitter communicates with a plurality of fixed wireless access points, to provide the position and tracking for persons in the area.

15 Claims, 5 Drawing Sheets a. Base station AP1, 3
b. Ref AP2
c. Person #1
d. Triangulation area for person #1    AP1, AP3
e. Triangulation area for ref. AP2    AP1, AP2
f. Person #2 — 30a    AP3, AP2 a. AP's received RSSI value for person's shoe:
   - $RSSI\_TX(Person, AP_n)$, n=1,2,3;
b. Shoe's received RSSI value from APn:
   - $RSSI\_RX(AP_n, Person)$, n=1,2,3;
c. Use minimum of two values for triangulation to reduce the RSSI error by reflection, diffraction scattering:
   - $RSSI\_AP_n = min(RSSI\_TX(Person, AP_n), RSSI\_RX(AP_n, Person))$, n=1,2,3;
d. Calculation the location of person with two AP's RSSI_APn;
   - $Pn = Tri(RSSI\_APn, RSSI\_APm)$, m,n=1,2,3;
➢ Average of three calculated results to reduce the RSSI error by random noise
   - $P = AVG(P1, P2, P3)$

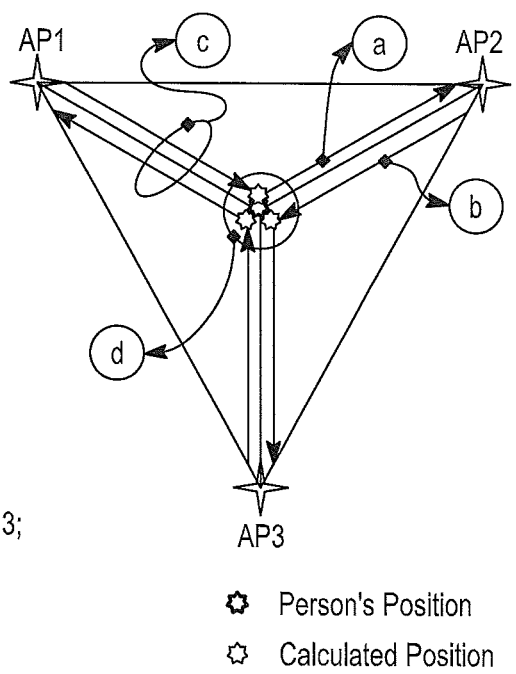

○ Person's Position
○ Calculated Position

*FIG. 6*

SMART SHOES WITH WIRELESS TRANSMITTER

FIELD

The application pertains to systems and methods of locating and tracking individuals in hazardous locations. More particularly, the application pertains to such systems and methods which provide prompt and automatic reporting of location and movement of individuals in selected, hazardous regions of interest.

BACKGROUND

Many types of work activities require individuals to be present in hazardous regions during their work days. Such occupations include but are not limited to various types of manufacturing, mining, construction and the like. Real time tracking of a person's position provides one more safety guarantee for people present in hazardous working areas. In some close spaces with special safety requirements such as intrinsic safety in the presence of hazardous gases, or, explosives or mines, the normal consumer position products are not able to provide the service with required safety levels.

BRIEF DESCRIPTION OF THE DRAWINGS

FIG. 6 is a diagram illustrating additional aspects of location processing in accordance herewith.

DETAILED DESCRIPTION

Figure 1:
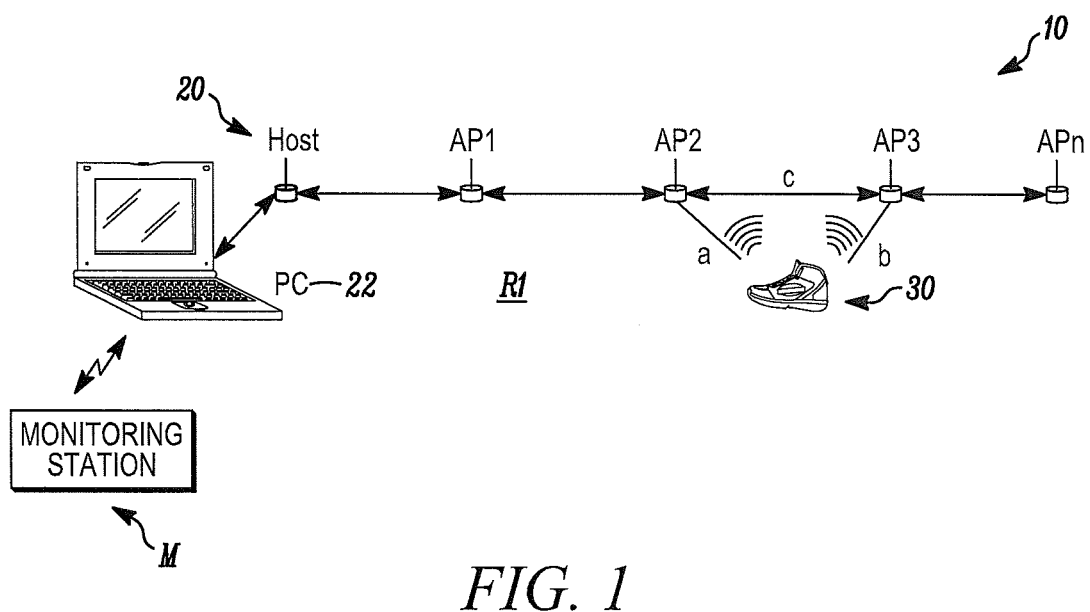
FIG. 1 illustrates a diagram of a system in accordance herewith.

While disclosed embodiments can take many different forms, specific embodiments thereof are shown in the drawings and will be deribed herein in detail with the understanding that the present disclosure is to be considered as an exemplification of the principles thereof as well as the best mode of practicing same, and is not intended to limit the application or claims to the specific embodiment illustrated.

In one aspect, embodiments hereof can safely provide both position information and tracking of individuals in hazardous work areas. This can be accomplished by providing smart shoes, which embody a wireless module and clicking or intermittent energizing a transmitter carried in the module. The transmitter communicates with a plurality of fixed wireless access points, to provide the position and tracking for persons in these areas.

In another aspect, a shoe can carry a battery powered module including a low power wireless transmitter a force responsive switch, or, clicking device. When a person wears the shoe with the module, the switch or clicking device will respond to applied forces or distortions due to walking and energize the transmitter to intermittently transmit RF signal bursts.

Multiple fixed access points (AP) will receive these signals. The wireless signal strength (RSSI) received by each AP in combination with optimized triangulation processing can be used to obtain real time location information for each individual in the region being monitored. The fixed APs can send the position information of those individuals in the region being monitored, to a displaced monitoring center. The person's location and tracking information, or moving trace, will be provided by processing information from the access points, at the monitoring center.

In embodiment hereof, the process can involve, sending out location indicating signals from each person in the area. The access points detect the incoming information as to locations of individuals. The RSSI value associated with each person at each access point can be transmitted from the APs to a displaced monitoring location.

In one aspect, a minimum RSSI value for each person can be sent to the associated monitoring center to carry out location and tracking processing. Advantageously, RSSI errors can be removed by such processing.

In disclosed embodiments, the transmitter equipped boots, or, shoes are advantageous in that they are wearable and the user wears them as any other shoes or boots. Only one boot or shoe needs to carry a transmitter.

Low power transmitters meet intrinsic safety requirements. Wireless networks of various types can be used with shoes in accordance herewith. Groups of three access points create a triangle grid. Multiple grids can provide coverage over a region of interest.

FIG. 1 illustrates a system 10 in a region R1 being monitored. In system 10 a plurality of access points, AP1, AP2 . . . APn, indicated at 20 are installed in the region R1 being monitored. One of the access points can be designated as a "Host".

The access points 20 can be in bidirectional communication with each other as well as with a personal computer 22. Neither the exact form of transmission, nor types of modulation are limitations hereof.

Figure 2A:
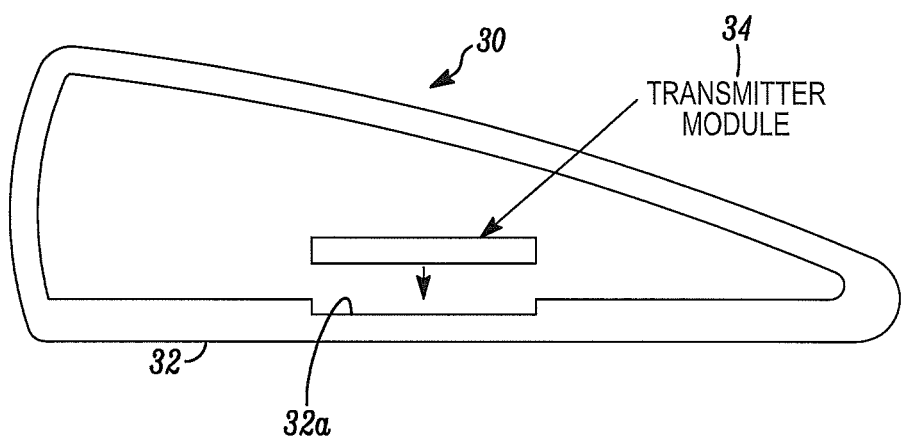
FIG. 2A is a side sectional view of a boot or shoe usable in the system of FIG. 1.
Figure 2B:
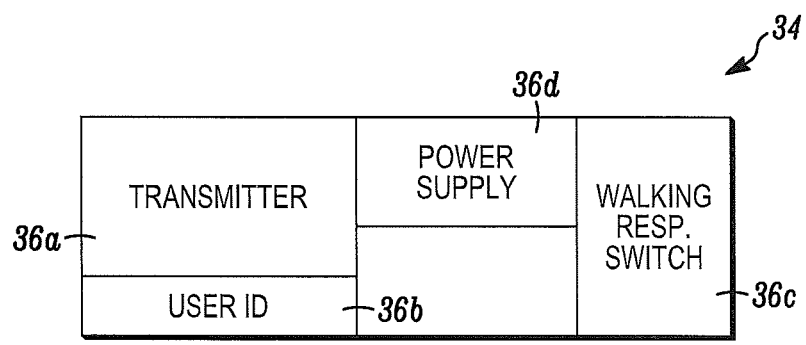
FIG. 2B is a block diagram of a transmitter module insertable into the boot or shoe of FIG. 2A.

Position and tracking information relative to an individual working or moving in the region R1 can be wirelessly coupled to computer 22 for processing there as well as at a displaced monitoring station M. With respect to FIGS. 2A, 2B the position and tracking information originates with the individual in the region R1 wearing boots or shoes, indicated at 30. The boots or shoes 30 have a walking sole 32 which defines within the boot or shoe 30 a recess or pocket 32a.

A wireless communications module 34 is carried in the recess 32a. The module 34 includes a transmitter 36a, and an identifier of a person, 36b which could be stored in a memory unit of the transmitter 36a. A walking or force responsive switch 36c carried by the module 34 is coupled to the transmitter 36a.

As the individual wearing the boot, shoe, or shoes 30 moves around in the region R1 the switch 36c intermittently changes state in response thereto. Switch 36c is coupled to power supply 36d, also carried by the module 34.

As the switch 36c changes state it couples electrical energy from supply 36d to transmitter 36a. Transmitter 36a in turn intermittently emits wireless signals having predetermined frequency and modulation characteristics as would be understood by those of skill in the art. The wireless signals, emitted by transmitter 36a are modulated by the identifier 36b of the person wearing the boot, shoe or shoes 30.

The signals emitted by the shoe 30 are sensed by the access points in the vicinity of the shoe 30, such as AP2, AP3 in FIG. 1. As discussed subsequently, signal strength of signals received at the respective access points can be processed and minimum RSSI values can be determined. Triangulation can be used to generate location and tracking information.

Figure 3:
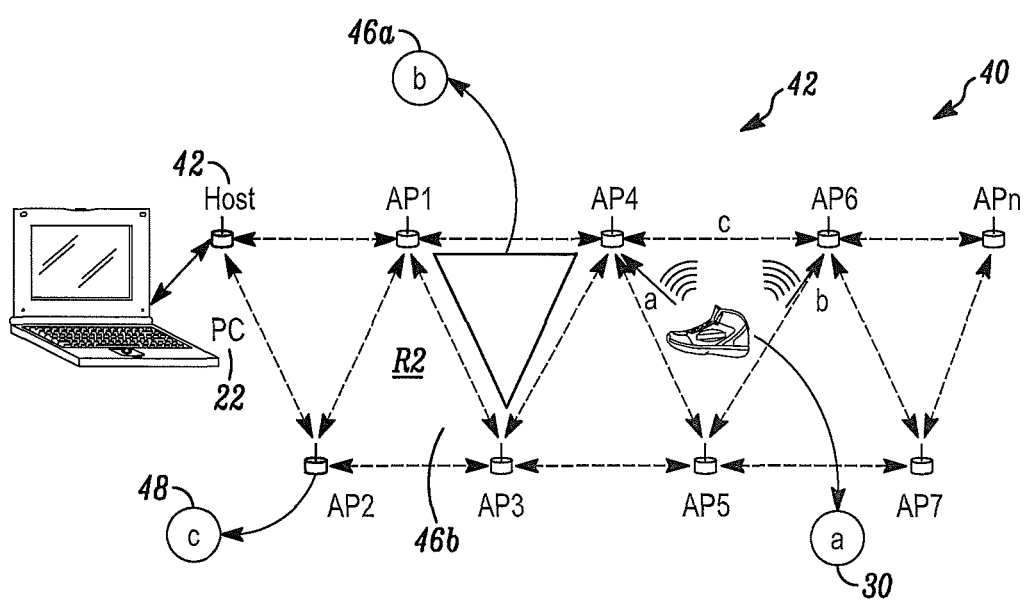
FIG. 3 is a diagram of another system in accordance herewith.

FIG. 3 illustrates another system 40 which can provide tracking and location information for the boot or shoe 30 in response to movement about a region R2 being monitored. A plurality of access points AP1 . . . APn, along with a host access point, generally indicated at 42, are coupled to each other and to a computer 22.

In the system 40 a plurality of triangle shaped grids, such as grids 46a, 46b, distributed about region R2 can provide location and tracking information for boot or shoe 30. A reference access point, 48, for example AP2 can facilitate optimized locating triangulation processing.

Figure 5:
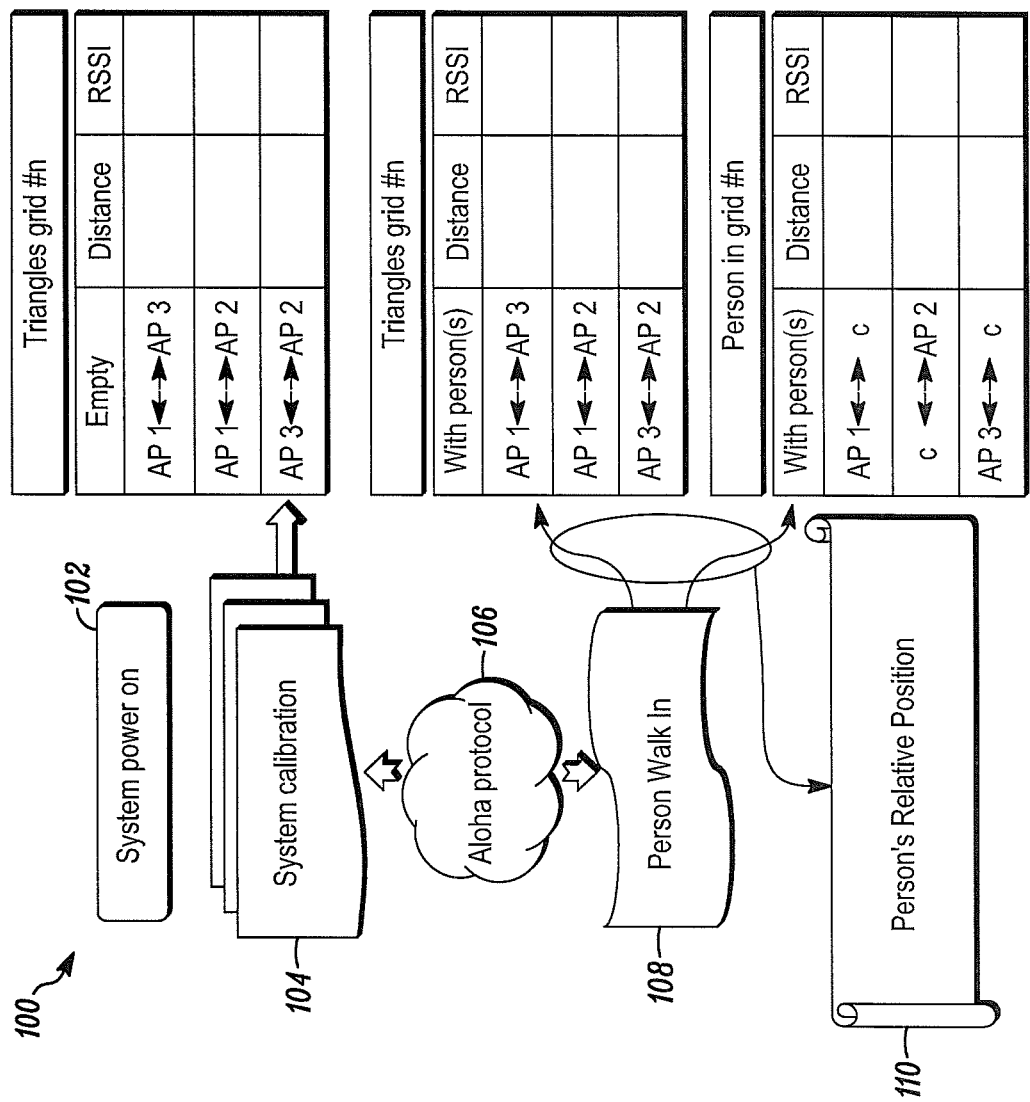
FIG. 5 is a flow diagram illustrating aspects of locating a boot or shoe using the system of FIG. 3.
Figure 4:
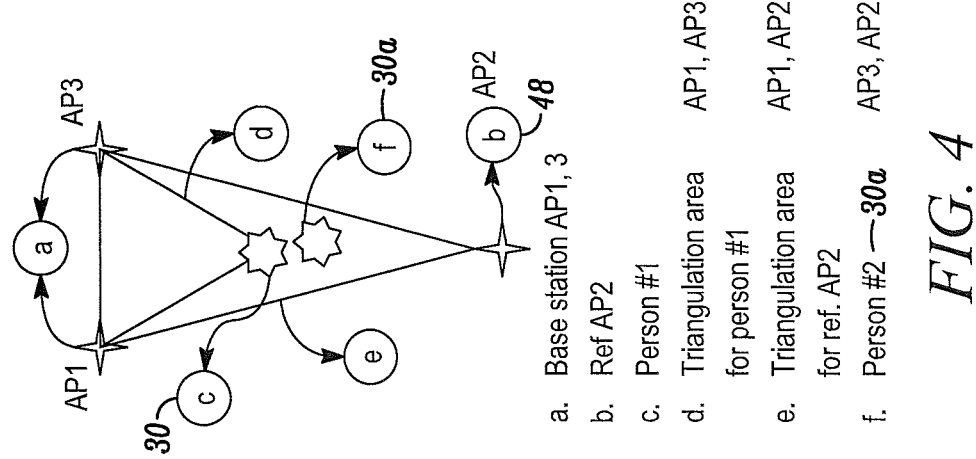
FIG. 4 is a diagram illustrating triangulation processing in the system of FIG. 3.

FIGS. 4-6 illustrate aspects of processing by the system 40. FIG. 4 illustrates triangulation areas for a boot or shoe 30 and two access pints AP1, AP3 and AP1, AP2 where AP2 functions as a reference access point.

FIG. 5 illustrates a process 100 in circumstances of empty grids, or where the boot 30 is present in a particular grid. The system 40 is first energized, as at 102. The system is calibrated as at 104 for empty grids. As those of skill will understand, the Aloha protocol can be used, as at 106, to avoid collisions from independent transmitters in different boots such as 30, 30a. Other protocols can be used without departing from the spirit and scope hereof.

Where a person walks into a grid such as the grid formed by access points AP1, AP2, AP3 as at 108 triangulation processing can establish the person's relative position as at 110. FIG. 6 illustrates aspects of grid signal processing to establish a location of the person wearing the boot 30. Processing can be carried out by computer 22 based on signals from the various access points as discussed above.

In summary, location identifying transmissions are sent out from the person in the region being monitored, as that person moves through the region. The access points return the location information along with associated RSSI values from the person. The minimum RSSI value can be used as the RSSI value for the person relative to the access points. The RSSI values can be used in carrying out the locating process.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
a foot cover;
a transmitter carried by the foot cover, the transmitter is responsive to at least one of cover deflection, cover bending or cover deformation to carry out a short term transmission;
a plurality of access points, at least some of which receive the brief transmissions; and
control circuitry coupled to the access points to make a location determination based on access point feedback from at least two different access ports, relative to at least some of the received transmissions.

2. An apparatus as in claim 1 where the brief transmissions comprise bursts on the order of one hundred milliseconds to two seconds.

3. An apparatus as in claim 2 which includes at least two access points.

4. An apparatus as in claim 3 which includes at least three access points.

5. An apparatus as in claim 1 where the control circuitry processes selected signals from the transmitter to identify a location of the foot cover.

6. An apparatus as in claim 5 wherein the control circuitry further processes the signals to trace movement of the foot cover.

7. An apparatus as in claim 6 wherein multiple location determinations made using at least two different pairs of access points.

8. An apparatus as in claim 7 which includes making RSSI determinations with respect to at least three different access points.

9. An apparatus as in claim 8 which includes reducing errors caused by random noise by averaging location determinations.

10. A method comprising:
providing a mobile transmitter;
providing a force responsive switch coupled to the transmitter;
applying an intermittent force to the switch to intermittently activate the transmitter, which transmits a source identifier of the transmissions, during a spaced apart sequence of selected time intervals;
receiving the transmissions at least two different locations, and responsive thereto, detecting a transmitter location during a selected time interval using a selected minimum RSSI value.

11. A method as in claim 10 which includes attaching the transmitter to a foot covering.

12. A method as in claim 11 causing the intermittent activation by moving the foot covering and identifies the source as a person associated with the foot covering.

13. A method as in claim 11 which includes providing receivers at the locations.

14. A method as in claim 11 which includes providing receivers at three different locations.

15. A method as in claim 10 which includes evaluating received signal strength and, responsive thereto, detecting transmitter locations, and tracking associated movement.

\* \* \* \* \*